United States Patent
Hedman et al.

(10) Patent No.: US 7,225,073 B2
(45) Date of Patent: May 29, 2007

(54) CRUISE CONTROL FOR VEHICLE

(75) Inventors: Anders Hedman, Marstrand (SE); Marcus Steen, Angered (SE); Anders Eriksson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 278 days.

(21) Appl. No.: 10/494,446

(22) PCT Filed: Oct. 30, 2002

(86) PCT No.: PCT/SE02/01969

§ 371 (c)(1),
(2), (4) Date: Nov. 1, 2004

(87) PCT Pub. No.: WO03/041987

PCT Pub. Date: May 22, 2003

(65) Prior Publication Data

US 2005/0085974 A1  Apr. 21, 2005

(30) Foreign Application Priority Data

Oct. 31, 2001 (SE) .................................... 0103630

(51) Int. Cl.
*B60T 8/32* (2006.01)
*G06F 7/00* (2006.01)
*F02D 9/02* (2006.01)

(52) U.S. Cl. ................. 701/93; 71/51; 71/70; 180/170; 477/34; 123/349

(58) Field of Classification Search .................. 701/36, 701/51, 54, 67, 70, 93–95, 213–214; 180/170; 477/34, 107; 340/438, 441; 123/349; 307/9.1
See application file for complete search history.

(56) References Cited

U.S. PATENT DOCUMENTS

| | | | | |
|---|---|---|---|---|
| 5,272,939 A | * | 12/1993 | Markyvech et al. | ........ 477/120 |
| 5,335,566 A | * | 8/1994 | Genise et al. | ................ 477/124 |
| 5,659,304 A | * | 8/1997 | Chakraborty | ............... 340/903 |
| 5,832,400 A | | 11/1998 | Takahashi et al. | |
| 6,029,107 A | | 2/2000 | Sato | |
| 2006/0074530 A1 | * | 4/2006 | Meyers et al. | .................. 701/1 |

FOREIGN PATENT DOCUMENTS

EP  1 053 903  11/2000

\* cited by examiner

*Primary Examiner*—Y. Beaulieu
(74) *Attorney, Agent, or Firm*—Young & Thompson

(57) ABSTRACT

The present invention relates to a motor vehicle comprising an internal combustion engine and a first electronic control unit (48) for controlling the engine depending on the setting of a manual throttle, an electronic control unit (45) for controlling the transmission, depending on a set position of a manual gear selector (46). The invention is characterized in that one of the control units is disposed, with fed-in parameters and thus at least knowledge of the target speed of the vehicle, the surrounding topology and the throttle opening position, to reduce the throttle opening, in those cases where the vehicle, relative to the target speed, has a speed below target speed and gravity can subsequently accelerate the vehicle. In a similar manner, the kinetic energy of the vehicle is used, in those cases where the vehicle has an above target speed and gravity can subsequently retard the vehicle.

13 Claims, 3 Drawing Sheets

CRUISE CONTROL FOR VEHICLE

FIELD OF THE INVENTION

The present invention relates to motor vehicle comprising an internal combustion engine and an electronic control unit for controlling the engine depending on the setting of a manual throttle, an electronic control unit for controlling the transmission, depending on a set position of a manual gear selector.

BACKGROUND OF THE INVENTION

In vehicles of this type there are today control units with a stored gear selector strategy, i.e. a time-based shifting sequence as a function of road incline, for example. A known technology is described in U.S. Pat. No. 5,832,400. For vehicles with a conventional automatic transmission, where the transmission shifts sequentially with a torque converter, there is a gear selection strategy based on an algorithm which takes into account a measuring point in the topology surrounding the vehicle, with instantaneous vehicle position as a reference point. By determining, by various methods, where the vehicle will be after a certain time interval, it is possible to modify the engine setting and the shifting points for the automatic transmission, i.e. at which rpm the transmission should shift up or down. Possible variants could be to use electronic maps together with a positioning system (e.g. a Global Positioning System, GPS) or extrapolate a future position for the vehicle. One disadvantage of this system is that it does not take into consideration how the road varies in elevation between two points of measurement, and extreme points (e.g. the crest of a hill) between the two points of measurement are thus not taken into account in certain cases. The engine and the transmission are set in accordance with the known technology, on the basis of how great the difference in elevation is between the two points of measurement, and the instantaneous throttle position. Throttle position means in this case and in the following text both an adjustable cruise control and an accelerator pedal.

U.S. Pat. No. 5,832,400 only takes into consideration, as was mentioned, a single point of measurement during a certain time or distance into the future, in order to see if the instantaneous engine torque will be sufficient, or if the engine and/or transmission needs to be reset. It is also described how a plurality of points of measurement can be used but in that case a mean value thereof is used, thus providing one value for the required driving force. With a transmission which is shifted sequentially and with the method just described, there is an uncertainty in the system which results in tangible consequences in the form of less than satisfactory cruise control function, uneven acceleration and unnecessarily large exhaust emissions.

Today, cruise controls function by controlling a throttle opening or a braking process, which is described in U.S. Pat. No. 5,894,731, until a selected or given target speed in reached. In practice this means that if a vehicle is moving downhill at a speed exceeding the target speed, the cruise control will attempt to brake the vehicle down to the target speed, regardless of the road incline after the end of the downhill stretch. This means that if, directly after the downhill stretch, there is an uphill incline, and the vehicle has been braked down to the target speed, the vehicle, if the uphill stretch is sufficiently steep, will move at below the target speed. The cruise control, in this situation, will compensate by greatly increasing the throttle opening and shifting down. Another example of the same type of problem is the case of the extension of the problem just described, where the vehicle is moving uphill at lower than target speed and reaches the crest, whereupon the continued open throttle will result in excess speed in the subsequent downhill stretch, and the vehicle will be forced to brake to once again reach the target speed.

There are today other types of cruise controls, for example those which use radar and adjust the vehicle speed to traffic in front, or transponders mounted on road signs for example. In both cases the target speed of the vehicle is changed continually depending on the surrounding traffic, weather conditions, wild animals other dynamic or random parameters. The purpose of the present invention is to achieve a motor vehicle of the type described by way of introduction, which removes the above mentioned problems by providing a system and a method, which, with the aid of a cruise control function, controls throttle opening and braking, where the braking is effected using auxiliary brakes for example, to obtain lower vehicle fuel consumption. There are also achieved lower noise and exhaust emissions, more even acceleration and more comfortable cruising.

SUMMARY OF THE INVENTION

This is achieved in a vehicle of the type described by way of introduction according to the invention by virtue of the fact that one of the control units is disposed, with fed-in parameters and thus at least knowledge of the target speed of the vehicle, the surrounding topology and the throttle opening position, to reduce the throttle opening, in those cases where the vehicle, relative to the target speed, has a speed below target speed and gravity can subsequently accelerate the vehicle, and to use the kinetic energy of the vehicle, in those cases where the vehicle has a speed above the target speed and gravity can subsequently retard the vehicle.

In a preferred embodiment, the second control unit is disposed, under set preconditions, to perform computer simulations for a longer period forward (30 seconds or more), where the information on instantaneous position is obtained with the aid of GPS and/or where future positions are provided by information from an electronic map.

In a second embodiment, with the aid of electronics and sensors, estimates, (extrapolations) can be made concerning road incline and information can thus be obtained on the topology surrounding the vehicle and its future position.

The present invention is preferably intended for, but is not limited to, automated manual transmissions. A significant difference in relation to the known technology (Automated Power Transmission) referred to, is that shifting in the present case takes place with force interruption. There is thus a clear advantage of using the system according to the invention, otherwise it is not certain that shifting up in an up-hill incline will be successful, even if the driving force were theoretically sufficient because if the shifting takes too long, the vehicle will be retarded too much.

With reference to the two cases (too low speed in an uphill incline and excessive speed in a downhill incline) which were exemplified previously, the present invention could in principle be summarized as follows:

1) At the request of the driver, with the aid of electronics and data from sensors, the second control unit, upon a decision based on a computer simulation, can deactivate applied auxiliary brakes, which would otherwise apply bracing torque, when the vehicle, without the braking torque, would achieve reduced fuel consumption and/or increased average speed.

2) At the request of the driver, with the aid of electronics and date from sensors, the second control unit, upon a decision based on a computer simulation, can adjust the throttle opening of a cruise control to the current driving resistance of the vehicle and that in the immediate future (30 seconds or more).

In order to additionally describe the present invention a few examples will be provided below of applications.

The second control unit is disposed, with the aid of electronics and sensors, to limit the throttle opening when there are large speed deviations and when the road is inclined downhill.

The second control unit is disposed, with the aid of electronics and sensors, to keep the throttle open when the vehicle speed is greater than that set in the cruise control and the vehicle is approaching an uphill incline in which the reduction in speed would be so great that the maximum engine torque would not be able to accelerate the vehicle before the vehicle speed has dropped to the target speed.

The second control unit is disposed, with the aid of electronics and data from sensors, to adjust the throttle opening when the vehicle is approaching the end of an uphill incline, and where the vehicle speed is less than the target speed, gradually adjusting to a future lesser throttle opening.

The second control unit, with the aid of electronics and sensors, is disposed to adjust the throttle opening, when the vehicle approaches the beginning of a downhill incline, to gradually adjust to a future lesser throttle opening, i.e. the throttle opening which together with gravity and driving resistance will accelerate the vehicle to the target speed within a predetermined time period.

The second control unit, with the aid of electronics and sensors, is disposed to adjust possibly applied auxiliary brakes and possibly the throttle opening, as the vehicle approaches the end of a downhill incline, to a future greater throttle opening required to maintain the target speed.

The second control unit, with the aid of electronics and sensors, is disposed to adjust possibly applied auxiliary brakes and possibly the throttle opening, as the vehicle approaches the end of a downhill incline, so as to permit a temporary increase in speed, the maximum level of which is predetermined in the second control unit.

The second control unit, with the aid of electronics and sensors, is disposed to release the auxiliary brakes, when the vehicle approaches an uphill incline and where the vehicle speed exceeds the target speed, to not brake off energy since the retardation of the vehicle in the uphill incline will adapt the vehicle speed to the target speed.

In the above description and in the following, it is stated that the various input data are fed into the second control unit which carries out the computer simulations. This function can, of course, also be taken over by the first control unit or at another physical location arranged for communication with the second control unit.

BRIEF DESCRIPTION OF THE DRAWINGS

The invention will be described in more detail below with reference to examples shown in the accompanying drawings, where.

DETAILED DESCRIPTION OF THE INVENTION

Figure 1:
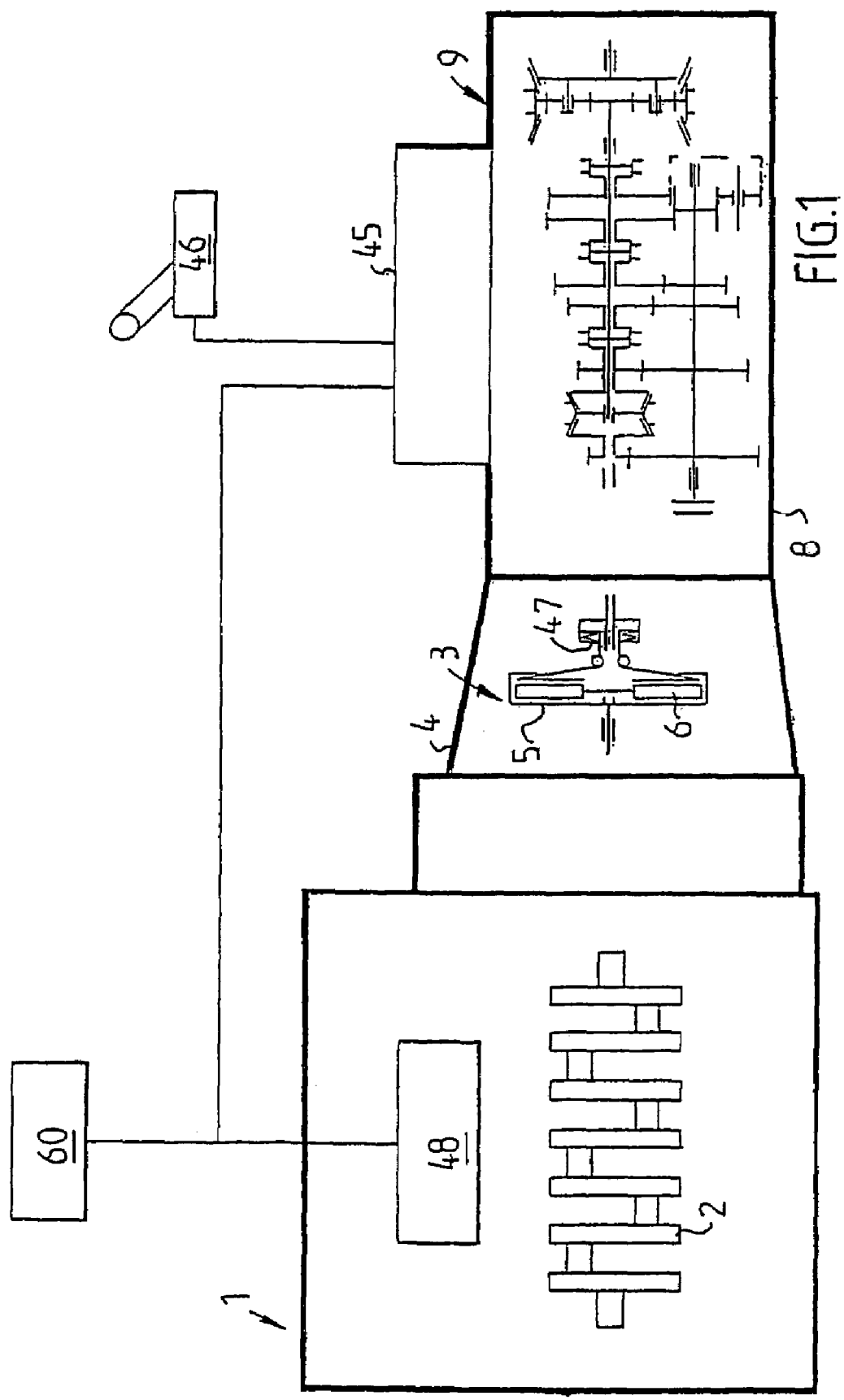
FIG. 1 shows a schematic representation of one embodiment of a drive unit according to the invention.

In FIG. 1, 1 designates a six-cylinder internal combustion engine, e.g. a diesel engine, the crankshaft 2 of which is coupled to a single-plate dry disk clutch which is designated generally by reference number 3 and is enclosed in a clutch case 4. Instead of a single-plate disk clutch, a dual disk clutch can be used. The crankshaft 2 is connected non-rotatably to the clutch housing 5 of the clutch 3, while its disk plate 6 is connected non-rotatably to an input shaft 7, which is mounted rotatably in the casing 8 of a gearbox designated generally by reference number 9. A main shaft 10 and an intermediate shaft 11 are also mounted rotatably in the casing 8. Further, there are illustrated a first control unit 48 for controlling the engine, a second control unit 45 for controlling the transmission and a manually operated electronic gear-speed selector 46, coupled to the second control unit 45. Auxiliary brakes 60 are controlled from and second control unit via the first control unit 48. The auxiliary brakes can be for example compression brakes or exhaust brakes. The first and second control units (48 and 45, respectively) are adapted for communication with each other.

Figure 2:
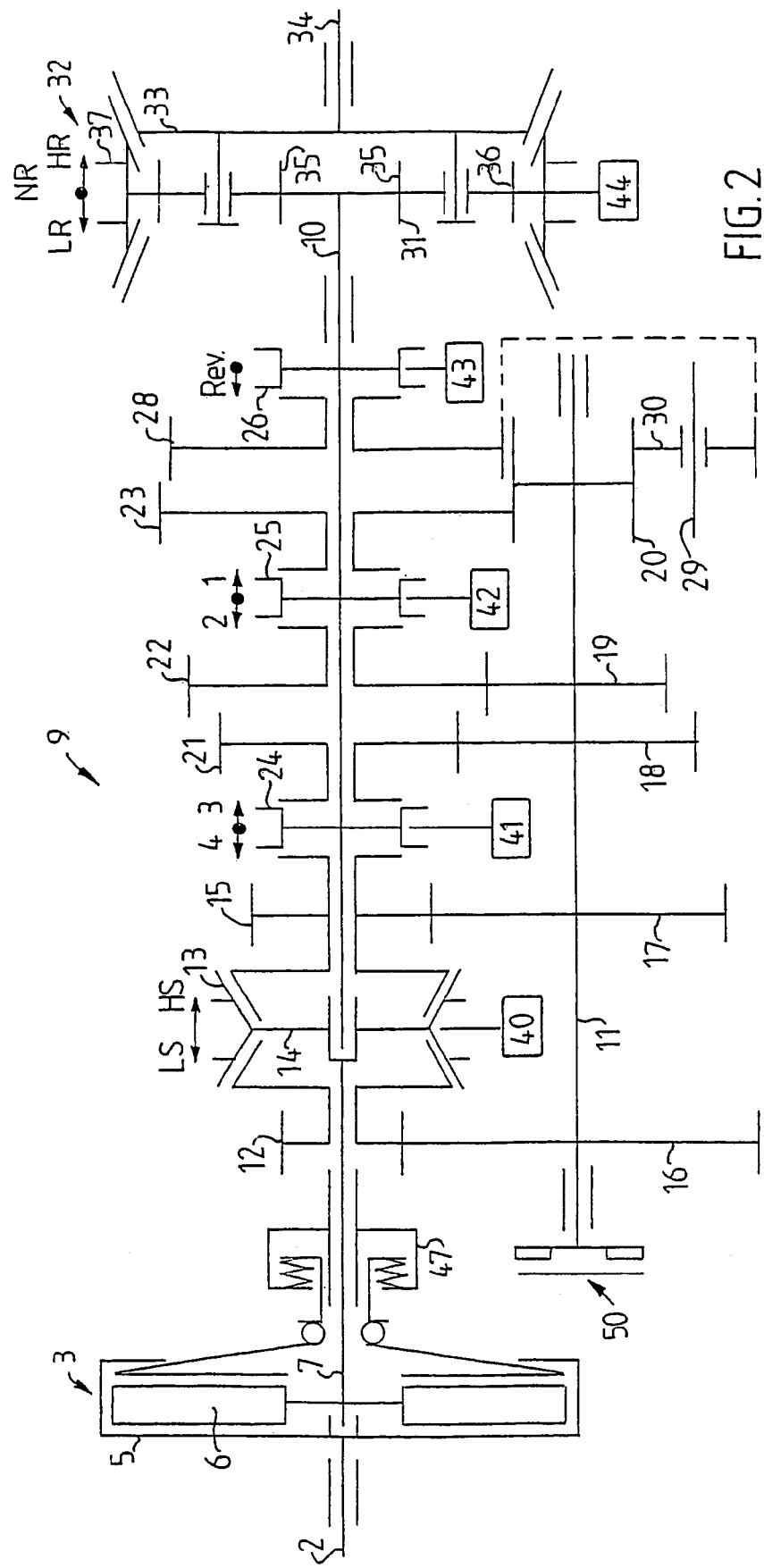
FIG. 2 shows the clutch and the gearbox in FIG. 1 on a larger scale.

As can be seen most clearly from FIG. 2, a gear wheel 12 is mounted rotatably on the input shaft 7 and is lockable on the shaft by means of an engaging sleeve 13 which is provided with synchronizing means and is mounted non-rotatably but axially displaceably on a hub 14 connected non-rotatably to the input shaft 7. By means of the engaging sleeve 13, a gear wheel 15 mounted rotatably on the main shaft 10 is also lockable relative to the input shaft 7. The gear wheels 12 and 15 engage with gear wheels 16 and 17, respectively, which are connected non-rotatably to the intermediate shaft 11. Arranged in a rotationally fixed manner on the intermediate shaft 11 are further gear wheels 18, 19 and 20 which engage with gear wheels 21, 22 and 23, respectively, which are mounted rotatably on the main shaft 10 and are lockable on the main shaft by means of engaging sleeves 24 and 25, respectively, which, in the illustrative embodiment shown, do not have synchronizing arrangements. A further gear wheel 28 is mounted rotatably on the main shaft 10 and engages with an intermediate gear wheel 30, which is mounted rotatably on a separate shaft 29 and engages in turn the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing with a low gear stage LS and a high gear stage HS. The gear wheel pair 15, 17 also forms, together with the gear wheel pairs 21, 18, 22, 19, 23, 20 and 28, 30, a basic gearbox with four forward gears and one reverse gear. Arranged in a rotationally fixed manner on the output end of the main shaft is a gear wheel 31 which forms the sun gear in a two-stage range gear of the planetary type designated by reference number 32, the planet wheel carrier 33 of which is connected in a rotationally fixed maimer to a shaft 34 which forms the output shaft of the gearbox. The planet wheels 35 of the range gear 32 engage with a ring gear 36, which, by means of an engaging sleeve 37, is lockable relative to the gearbox casing 8 for low range LR and relative to the planet wheel carrier 33 for high range HR. The engaging sleeve also has a neutral position NR between the gear positions LR and HR. In the neutral position NR the output shaft 34 is released from the main shaft 10.

The engaging sleeves 13, 24, 25, 26 and 37 are displaceable as shown by the arrows in FIG. 2, to provide the gear stages shown next to the arrows. The displacement is brought about by servo devices 40, 41, 42, 43 and 44 which are indicated diagrammatically in FIG. 2 and may be pneumatically operated piston/cylinder arrangements of the type used in a gearbox of the type described above, which is marketed under the name Geartronic®. The servo devices are controlled by an electronic control unit 45 (FIG. 1), comprising a microcomputer, depending on signals fed into the control unit representing the various engine and vehicle data which comprise at least engine speed, vehicle speed, throttle pedal position and, in this case, engine brake on/off, when an electronic gear selector 46 coupled to the control unit 45 is in its automatic transmission position. When the selector is in the position for manual shifting, shifting is effected via the gear selector 46 at the command of the driver. The control unit 45 also controls fuel injection, that is to say the engine speed, depending on the throttle pedal position, and also the air supply to a pneumatic piston/cylinder arrangement 47, by means of which the clutch 3 is engaged and disengaged.

The second control unit 45 is programmed in a known manner so that it keeps the clutch 3 engaged when the vehicle is standing still and the gear selector 46 is in the neutral position. This means that the engine drives the input shaft 7 and thus also the inter-mediate shaft, while the output shaft 34 is disengaged. An auxiliary unit, e.g. an oil pump for lubricating the gearbox, can possibly be driven by the intermediate shaft in this position. The second control unit 45 is also programmed, when the vehicle is standing still and the gear selector is moved from the neutral position to a shift position, either to a position for automatic shifting or to a position with a start-off gear selected by the driver, to first release the clutch 3, then brake the intermediate shaft 11 to stop with the aid of the intermediate shaft brake 50, indicated in FIG. 2, which can be a brake device, which can be known per se, controlled by the control unit 45. With the intermediate shaft 11 braked to stop or at least nearly to stop, the control unit 45 now initiates the shift in the basic gearbox to a gear ratio which is provided by the automatic shifter or selected by the driver. When the driver, after engaging the gear, opens the throttle, the accelerator pedal functions as a reverse clutch pedal, which, via the control unit, gradually increases the clutch engagement with increasing throttle opening.

Figure 3:
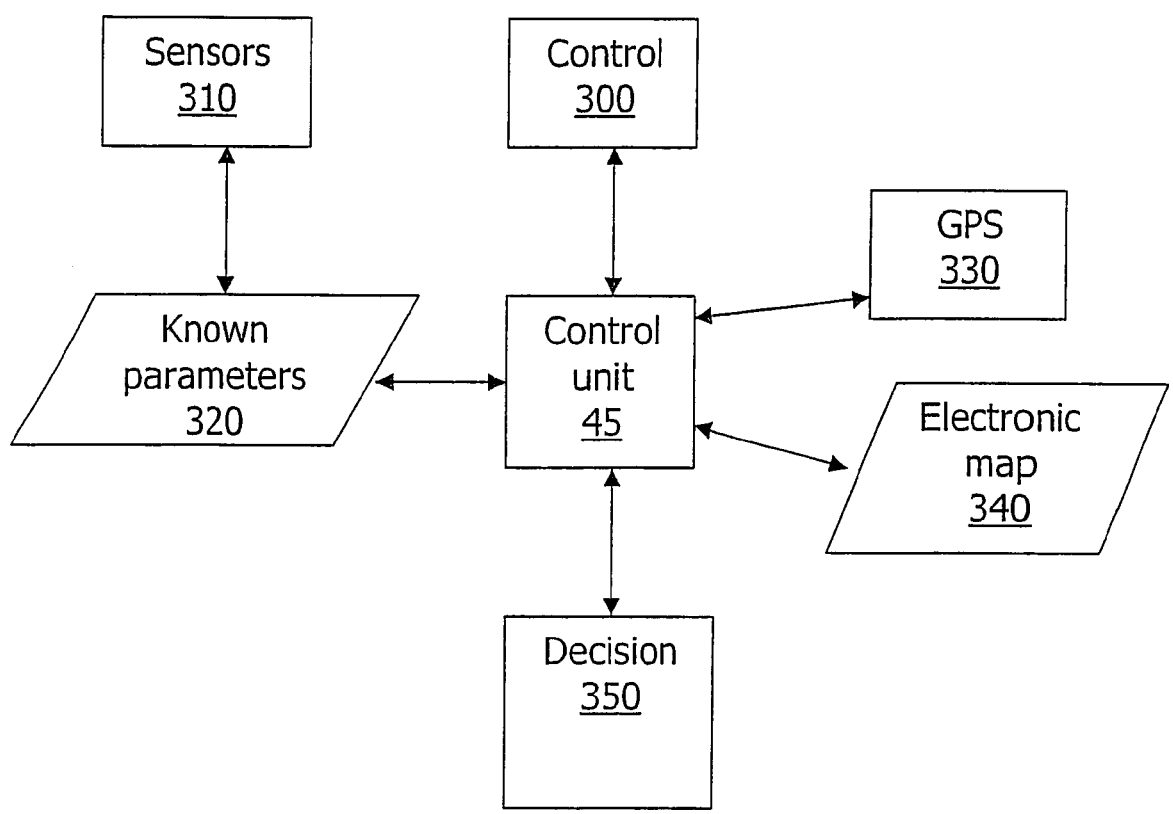
FIG. 3 shows an overview of inputs into the second control unit.

FIG. 3 illustrates schematically input which the second control unit 45 needs to be able to male a decision to close the throttle opening or brake the vehicle in accordance with the present invention. With one control 300 for manual turning on or off of the present function, the driver can actively select the process. The switch 300 is adapted for communication with the second control unit 45. An electronic map 340, for example stored on a CD-ROM (Compact Disc Read Only Memory) contains the information on a region's topology necessary for the computer simulation, i.e. at least gradients or elevation values for the route, with sea level as a reference, for example, and any information concerning speed limits along the route. The computer simulation uses parameters 320 sent from meters and sensors 310, in accordance with known technology. These consist at least of vehicle or train weight, instantaneous vehicle speed, gear ratios, degrees of efficiency, engine rpm, throttle opening position (even throttle opening position change), instantaneous position, road incline (not from electronic map), ambient temperature (which affects the fuel/air mixture), driving resistance and the engine dynamics of the engine. With the necessary information, the second control unit 45 can compute (simulate over a certain, predetermined time) i.a. estimated, future required acceleration(or retardation) and fuel consumption. Furthermore, FIG. 3 shows a symbol for GPS 330, which communicates with the second control unit, possibly also through the sensors 310. As an output from the second control unit 45, there is sent a decision 350, i.e. a controlling of the auxiliary brakes 60 for example or a throttle opening for the vehicle.

The invention claimed is:

1. A motor vehicle comprising an internal combustion engine and an electronic control unit (48) for controlling the engine depending on the setting of a manual throttle control, a transmission, and an electronic control unit (45) for controlling the transmission, depending on a set position of a manually operated electronic gear selector (46), characterized in that one of the control units is disposed, with fed-in parameters and thus at least knowledge of the target speed of the vehicle, the surrounding topology and the throttle opening position, to reduce the throttle opening, in those cases where the vehicle, relative to the target speed, has a speed below target speed and gravity can subsequently accelerate the vehicle, and use the kinetic energy of the vehicle, in those cases where the vehicle has a speed above target speed and gravity can subsequently retard the vehicle.

2. Motor vehicle according to claim 1, characterized in that the instantaneous vehicle position is determined by a GPS (350) (Global Positioning System) unit which is coupled to one of the control units for instantaneous determination of vehicle position.

3. Motor vehicle according to claim 2, characterized in that one of the control units is disposed to be given information from an electronic map (340) on the topology surrounding the vehicle.

4. Motor vehicle according to claim 1, characterized in that one of the control units is disposed to be given information from sensors (310), and, at least with knowledge of instantaneous vehicle position, speed and road incline, extrapolate through calculation, a future position of the vehicle.

5. Motor vehicle according to claim 1, characterized in that the engine is coupled to a clutch (3) and an automated transmission (9) between the engine and the driving wheels and is provided with at least an auxiliary brake.

6. Motor vehicle according to claim 1, characterized in that the derivative and acceleration of the throttle opening position, the instantaneous or extrapolated value, representing the intentions of the driver, also in combination with a cruise control function, are parameters in a computer simulation connected to a gear selection strategy.

7. Motor vehicle according to claim 1, characterized in that one of the control units is disposed, with the aid of electronics and sensors, to limit the throttle opening increase of a cruise control at great speed deviations and when the road is inclined downhill.

8. Motor vehicle according to claim 1, characterized in that one of the control units is disposed, with the aid of electronics and sensors, to keep the throttle open when the vehicle speed is greater than that set in the cruise control and the vehicle is approaching an uphill incline in which the reduction in speed would be so great that the maximum engine torque would not be able to accelerate the vehicle before the vehicle speed has dropped to the target speed.

9. Motor vehicle according to claim 1, characterized in that one of the control units is disposed, with the aid of electronics and data from sensors, to adjust the throttle opening when the vehicle is approaching the end of an uphill incline, and where the vehicle speed is less than the target speed, gradually adjusting to a future lesser throttle opening.

10. Motor vehicle according to claim 1, characterized in that one of the control units is disposed, with the aid of electronics and sensors, to adjust the throttle opening, when the vehicle approaches the beginning of a downhill incline, to gradually adjust to a future lesser throttle opening, i.e. the throttle opening which together with gravity and driving resistance will accelerate the vehicle to the target speed within a predetermined time period.

11. Motor vehicle according to claim 1, characterized in that one of the control units is disposed, with the aid of electronics and sensors, is disposed to adjust possibly applied auxiliary brakes and possibly the throttle opening, as the vehicle approaches the end of a downhill incline, to a future greater throttle opening required to maintain the target speed.

12. Motor vehicle according to claim 1, characterized in that one of the control units is disposed, with the aid of electronics and sensors, to adjust possibly applied auxiliary brakes and possibly the throttle opening, as the vehicle approaches the end of a downhill incline, so as to permit a temporary increase in speed, the maximum level of which is predetermined in the second control unit.

13. Motor vehicle according to claim 1, characterized in that one of the control units is disposed, with the aid of electronics and sensors, is disposed to release the auxiliary brakes, when the vehicle approaches an uphill incline and where the vehicle speed exceeds the target speed, to not brake off energy since the retardation of the vehicle in the uphill incline will adapt the vehicle speed to the target speed.

* * * * *